US006830446B2

(12) United States Patent
Harada et al.

(10) Patent No.: US 6,830,446 B2
(45) Date of Patent: Dec. 14, 2004

(54) CLAMPING APPARATUS

(75) Inventors: Hiroyoshi Harada, Tokyo (JP); Itaru Matsuo, Tokyo (JP); Takehiko Ikegami, Tokyo (JP); Hiromichi Yamada, Tokyo (JP); Jyunji Sakakibara, Tokyo (JP); Hiroaki Tanoue, Tokyo (JP)

(73) Assignees: Mitsubishi Electric Engineering Company Limited, Tokyo (JP); Renesas Technology Corp., Tokyo (JP)

(*) Notice: Subject to any disclaimer, the term of this patent is extended or adjusted under 35 U.S.C. 154(b) by 188 days.

(21) Appl. No.: 10/264,354

(22) Filed: Oct. 4, 2002

(65) Prior Publication Data

US 2003/0108636 A1 Jun. 12, 2003

(30) Foreign Application Priority Data

Oct. 23, 2001 (JP) ...................................... 2001-324886

(51) Int. Cl.[7] .............................................. B29C 45/66
(52) U.S. Cl. ..................................... 425/451.6; 425/593
(58) Field of Search ............................. 425/451.6, 593; 384/127, 454, 455

(56) References Cited

U.S. PATENT DOCUMENTS 3,813,136 A * 5/1974 Pitner ......................... 384/559
5,176,923 A * 1/1993 Ito ............................ 425/451.6
5,419,641 A * 5/1995 Fujinami et al. ............ 384/470
6,402,497 B1 * 6/2002 Banjyo et al. ............... 425/593

FOREIGN PATENT DOCUMENTS

| JP | 5-269776 | 10/1993 |
| JP | 9-164530 | 6/1997 |
| JP | 11-235740 | 8/1999 |

* cited by examiner

Primary Examiner—James P. Mackey
(74) Attorney, Agent, or Firm—Leydig, Voit & Mayer, Ltd.

(57) ABSTRACT

A clamping apparatus includes upper and lower platens; one or more tiebars connecting the platens; and an intermediate platen between the upper and lower platens for movement relative to and along the tiebars. Upper and lower mold halves are provided on the upper and intermediate platens, respectively. A linkage connects the lower and intermediate platens. The linkage includes upper and lower links connected with each other for rotation on an intermediate shaft. The upper and lower links are pivotably supported on first and second shafts fixed to the intermediate and lower platens, repectively. The intermediate shaft is operatively connected with a drive mechanism so that the drive mechanism transmits a driving force to the linkage, and the lower platen is moved relative to the intermediate platen. A set of a radical needle bearing and a thrust bearing is used for at least one of the intermediate, first, and second shafts.

4 Claims, 4 Drawing Sheets

CLAMPING APPARATUS

TECHNICAL FIELD

The present invention relates generally to a clamping apparatus, and more particularly to a mold clamping apparatus used for an injection molding machine.

BACKGROUND OF THE INVENTION

Typically, a mold clamping device has upper and lower mold halves for movement relative to each other to define a mold cavity by closure of the mold halves. The device is controlled so that a predetermined force clamping the mold halves is obtained and sustained for a predetermined time.

A toggle-type clamping arrangement is typically used for moving one of the mold halves relative to the other along a longitudinal axis of the device. In an exemplary arrangement, one end of each of a pair of links in a toggle linkage is supported for rotation on pivot pins. One of the pivot pins is secured to a movable unit having an upper mold half while the other is secured to a stationary unit having a lower mold half. The other end of each of the pair of links is supported for rotation on an intermediate pivot pin, which is connected operatively with a drive capable of moving the intermediate pin in a direction transverse to the longitudinal axis. For, example, a ball screw is used in the drive mechanism. With this construction, the transverse movement of the intermediate pivot pin allows the movable unit to move up and down (in the longitudinal direction) relative to the stationary unit.

In this clamping device using such a linkage, in order to support a relatively large clamping force, a radial needle bearing having an excellent load resistance is preferably used as a bearing mounted, for example, between a link and pivot pin. However, there are cases where thrust is generated because the rollers skew between the outer and inner rings of the bearing, which may damage components such as the bearing, the link or the ball screw.

SUMMARY OF THE INVENTION

Hence, it is an object of the present invention to provide a clamping apparatus with high reliability capable of preventing such damage of the components.

It is another object of the present invention to provide a radial needle bearing that serves to prevent such damage effectively.

To achieve the above object, a clamping apparatus of the present invention includes upper and lower platens; one or more tiebars for connecting the upper and lower platens; an intermediate platen provided between the upper and lower platens for movement relative to and along the tiebars. Upper and lower mold halves are provided on the upper and intermediate platens, respectively. A linkage is provided for connecting the lower and intermediate platens. A drive mechanism drives the linkage so that the lower platen is moved relative to the intermediate platen, so that the upper mold half on the upper platen is moved relative to the lower mold half on the intermediate plate. The linkage includes upper and lower links connected with each other for rotation on an intermediate shaft. The upper link is pivotably supported on a first shaft fixed on the intermediate platen. The lower link is pivotably supported on a second shaft fixed on the lower platen. The intermediate shaft is operatively connected with the drive mechanism so that the mechanism transmits a driving force to the linkage. A set of radial needle bearing and thrust bearing is used for at least one of the intermediate, first and second shafts.

According to the apparatus, where the thrust may be generated when the rollers of the radial needle bearing in the linkage skew, the trust can be applied to the trust bearing, so that the components of the linkage are prevented from being damaged.

A radial needle bearing of the present invention includes a set of needle rollers each having spherical axial ends; and holding members facing said axial ends of the rollers for restraining against axial movement of the rollers. The holding members are separated from outer and inner rings of the bearing. Even if the rollers skew, the rollers can be brought into contact with the holding members through the spherical ends. With this construction, a stress concentration does not occur as in the case where needle rollers each having cylindrical or flat ends are used and, as a result, the rollers that skew may be brought into contact with the holding members through the edges. This has the advantage to improve the fatigue life of the holding members.

BRIEF DESCRIPTION OF THE DRAWINGS

Corresponding reference numbers indicate corresponding parts throughout the several views of the drawings.

DETAILED DESCRIPTION OF THE PREFERRED EMBODIMENTS

First Embodiment

Figure 1:
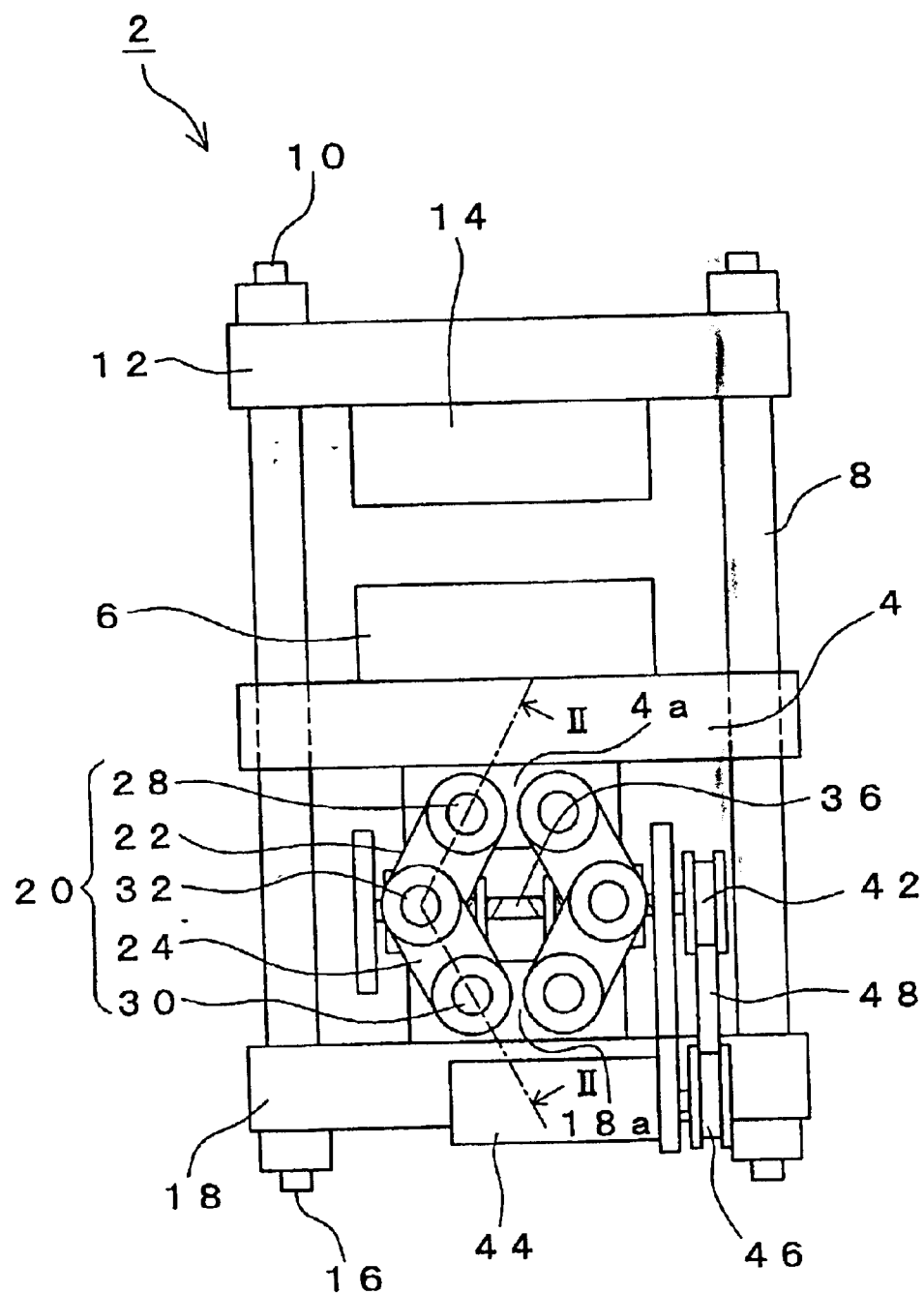
FIG. 1 is a schematic side elevation view of a first embodiment of the clamping device according to the present invention.
Figure 2:
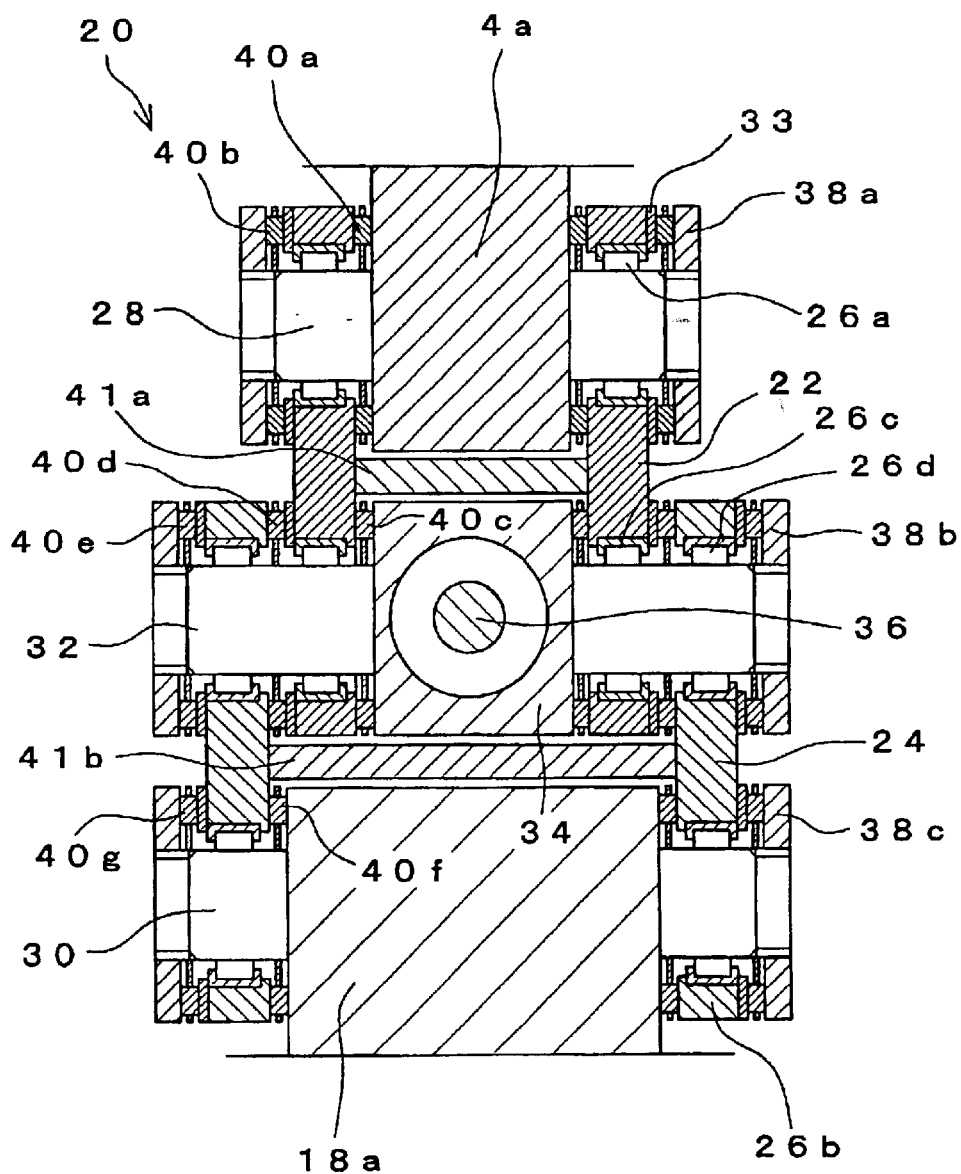
FIG. 2 is a schematic cross sectional view of a toggle arrangement, taken along the line II—II in FIG. 1.

Referring now to the drawings, and particularly to FIGS. 1 and 2 thereof, there is shown a clamping device 2 that includes an intermediate platen 4 secured to a base not shown. The intermediate platen 4 has a lower mold half 6 on the upper surface. Four parallel tiebars 8 (only two tiebars are shown.) are slidably inserted through the holes formed in the intermediate platen 4. An upper platen 12 is secured via nuts 10 to the upper portions of the tiebars 8. The upper platen 12 has an upper mold half 14 on the lower surface. A lower platen 18 is secured via nuts 16 to the lower portions of the tiebars 8.

The lower platen 18 is connected through a clamping system 20 with the intermediate platen 4 so that the drive of the system 20, which will be described below, allows the lower platen 18 and the upper platen 12 connected thereto via the tiebars 8 to move up and down (in the longitudinal direction of the device 2) relative to the intermediate platen 4.

In this embodiment, the clamping system 20 is in the form of two double-toggle arrangements (one of them is shown.) each including a left toggle linkage and a right toggle linkage, with each toggle linkage being the mirror image of the other.

The linkage 20 is shown in greater detail in FIG. 2. The linkage has upper and lower links 22 and 24. The upper end of the upper link 22 is supported rotatably through a radial needle bearing 26a on a shaft 28 extending transversely from the support member 4a provided on the lower surface of the intermediate platen 4. The lower end of the lower link 24 is supported rotatably through a radial needle bearing 26b on a shaft 30 extending transversely from the support member 18a provided on the upper surface of the lower platen 18. The lower end of the upper link 22 and the upper end of the lower link 24 are supported rotatably on a transverse shaft 32 through the radial needle bearings 26c and 26d, respectively. It is to be noted that, although each of the radial needle bearings 32a–32d in the drawing has an outer ring formed with two annular flanges, the structure of the radial needle bearing is not limiting of the invention. In the drawing, reference number 33 represents a holding member for fixing a radial needle bearing to the corresponding link. As known in the art, the rollers of a retainerless needle bearing are easier to skew than those of a needle bearing using a retainer. The radial needle bearing used is a retainerless bearing, although it is not limiting of the invention.

The one ends of the two shafts 32 of the two left linkages 20 (which are located on the left side in FIG. 1) are connected with a traveling nut 34. Likewise, the one ends of the two shafts 32 of the two right linkages 20 (which are located on the right side in FIG. 1) are connected with another traveling nut 34. The two traveling nuts 34 are threadedly connected with a ball screw 36 extending in a transverse direction. The grooves of the ball screw 36 for receiving balls (not shown) are formed to allow the simultaneous inward or outward movement of the two traveling nuts 34 as the ball screw 36 is rotated. The rotation of the ball screw 36 allows the linkage 20 to be driven so that the lower platen 18 is moved upwardly or downwardly.

The other ends of the shafts 28, 30 and 32 are threadedly connected with locknuts 38a, 38b and 38c, respectively. Thrust bearings 40a–40g are provided between the support member 4a of the intermediate platen 4 and upper link 22, between the upper link 22 and locknut 38a, between the traveling nut 34 and upper link 22, between the upper link 22 and lower link 24, between the lower link 24 and locknut 38b, between the support member 18a of the lower platen 18 and lower link 24, and between the lower link 24 and locknut 38c, respectively. Although a needle bearing is used as thrust bearing in the embodiment, a ball bearing or slide bearing may be used instead. Note that the thrust needle bearing 40 is configured so that the needle rollers thereof are held by a retainer and put directly between the side components without bearing rings.

The upper links 22 of the two linkages 20 that are located on the left or right side in FIG. 1 are connected with each other via a connecting spacer (connecting member) 41a, as shown in FIG. 2. Likewise, the lower links 24 of the two linkages 20 that are located on the left or right side in FIG. 1 are connected with each other via a connecting spacer (connecting member) 41b, as shown in FIG. 2.

The ball screw 36 carries a driven pulley 42 on its one end. A motor 44 carries and drives a driving pulley 46. A belt 48 is wound around the pulleys 42 and 46 to transmit the rotation of the motor 44 to the ball screw 36.

With the clamping device 2 so constructed, the motor 44 is rotated in a given direction to transmit a driving force via the driving pulley 46, the belt 48, the driven pulley 42 and then the ball screw 36 to rotate the ball screw 36. Accordingly, the traveling nuts 34 and shafts 32 of the linkages 20 fixed thereto are moved inwardly to allow the lower platen 18 to move downwardly. The tiebars 8 are slid downwardly relative to the intermediate platen 4 so that the upper platen 12 fixed to the tiebars 8 is lowered until the upper mold half 14 on the upper platen 12 is brought into contact with the lower mold half 6 on the intermediate platen 4. The upper mold half 14 is additionally moved downwardly until a predetermined clamping force is obtained. Note that the clamping force can be measured for example by measuring the amount of movement of the tiebars 8.

After the mold halves 6 and 14 are clamped, a molding process is performed. Then, the motor 44 is rotated in the reverse direction so that the traveling nuts 34 and the shafts 32 of the linkages 20 fixed thereto are moved outwardly to allow the lower platen 18 to move upwardly. Accordingly, the upper platen 12 fixed via the tiebars 8 to the lower platen 18 and the upper mold half 14 are lifted.

If the rollers of the radial needle bearings 26 skew during the operation of the clamping device 2, since the thrust can be applied to the thrust bearings 40, a force tending to bend the upper and lower links 22 and 24 is much smaller than in the case where the thrust bearings 40 are not incorporated in the linkages 20. If the rollers of the bearings 26 skew, the links 22, 24 and the shafts 28, 30, 32 are applied with the same load of thrusts in opposite directions. The thrust applied to the links 22 and 24 is applied via the thrust bearings 40 to the components 4, 18, 38 and 36. Since these components are fixed to the shafts 28, 30 and 32, the thrust applied to the shafts 28, 30 and 32 and the thrust to the links 22 and 24 are balanced in the shafts 28, 30 and 32. Therefore, components other than the shafts 28, 30 and 32 such as the ball screw 36 (which is extended in a direction perpendicular to the thrust) are applied with substantial no thrust, resulting in a very low possibility of damages caused by the thrust. In addition, the spacers 41a and 41b that connect the links 22 and the links 24, respectively, of the two linkages 20 arranged on the left or right side in FIG. 1 allow the rigidity of the linkages 20 to be improved. The thrust which may generate in the radial needle bearings 26 of one of the linkages 20 can be applied not only to the thrust bearings 40 of the one linkage 20 but also to the thrust bearings 40 of the other linkage 20, which results in providing the clamping apparatus 2 with higher reliability. Moreover, the locking of the locknuts 38a, 38b and 38c to pre-pressure the links 22, 24, the shafts 28, 30, 32 and the thrust bearings 40 can restrain variations in loads applied to each components. This has the advantage to reduce the displacement and stress amplitude of each component and therefore improve the accuracy of clamping and prevent damages of the components.

Second Embodiment

Figure 3:
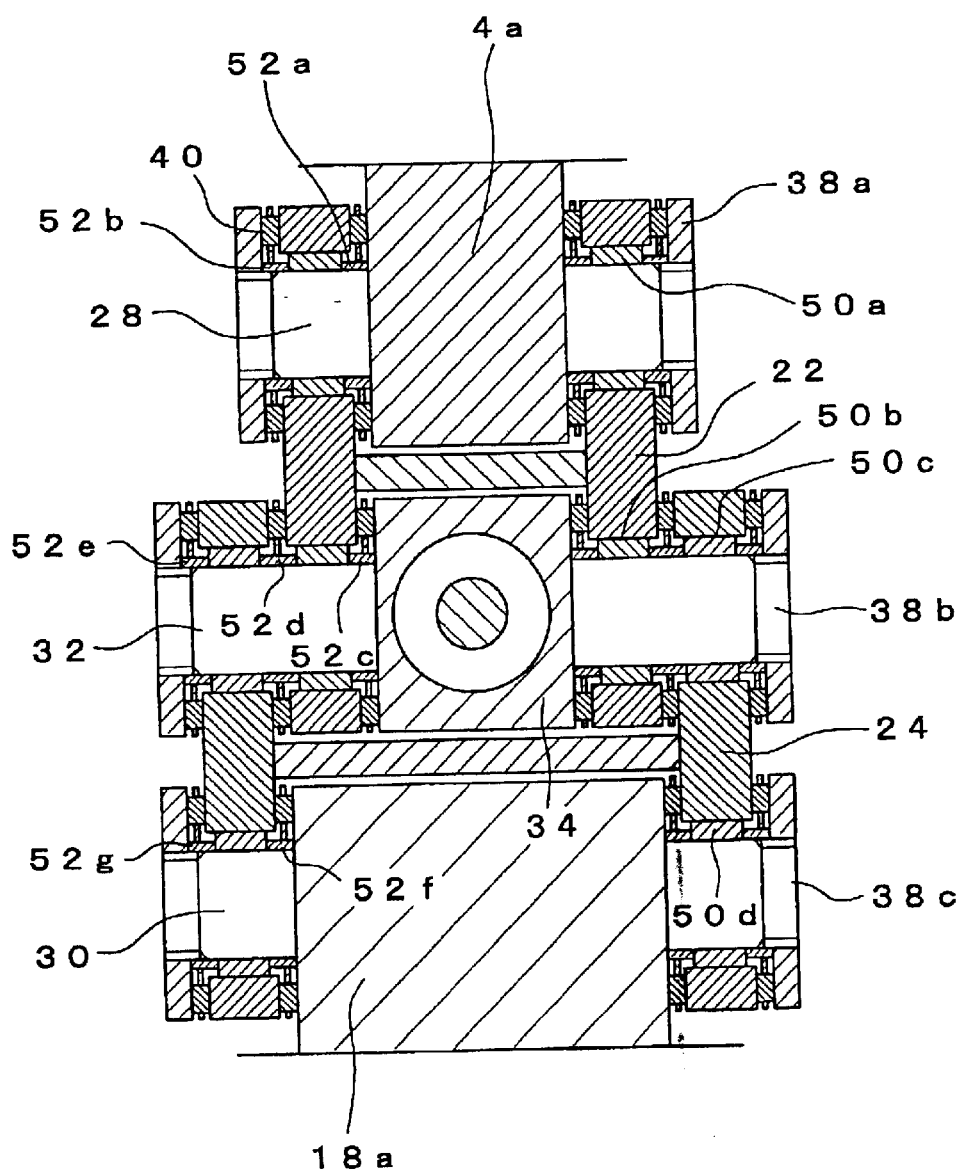
FIG. 3 is a schematic cross sectional view of a toggle arrangement, similar to FIG. 2, of a second embodiment of the clamping device according to the present invention.

Referring now to FIG. 3, the clamping device of the second embodiment according to the present invention will be described hereinafter. The toggle arrangement of the clamping device is similar to that in FIG. 2 except for the details described below.

Specifically, sets of radial needle rollers 50a–50d are provided between the upper link 22 and shaft 28, between the upper link 22 and shaft 32, between the lower link 24 and shaft 32, and between the lower link 24 and shaft 30, respectively.

In order to restrain the radial needle rollers 50a–50d against axial movement, annular spacers (annular holding members) 52a–52g are mounted between the support member 4a of the intermediate platen 4 and set of rollers 50a, between the set of rollers 50a and locknut 38a, between the traveling nut 34 and set of rollers 50b, between the set of rollers 50b and set of rollers 50c, between the set of rollers 50c and locknut 38b, between the support member 18a of the lower platen 18 and set of rollers 50d, and between the set of rollers 50d and locknut 38c, respectively. For rotational movement of the radial needle rollers 50 relative to the spacers 52, there is a play between the ends of the rollers 50 and the ends of the spacers 52 facing the rollers 50.

Bearing steel may be used as a material of the spacers 52. Each of the annular spacers 52 has an inner diameter slightly larger than the outer diameter of the opposed shaft 28, 30 or 32, so that it is not fixed on the opposed shaft. Therefore, if the radial needle rollers 50 skew so that the trust may be applied to the corresponding spacers 52, a stress is not concentrated on the contact region between the spacers 52 and the opposed shaft 28, 30 or 32.

In the embodiment, each of the annular spacers 52 has an outer diameter smaller than the bearing bore diameter of the opposed link 22 or 24 defining an outer ring of the bearing. However, the annular spacers 52 may be in contact with the link 22 or 24 as long as they are not fixed to each other.

Third Embodiment

Figure 4:
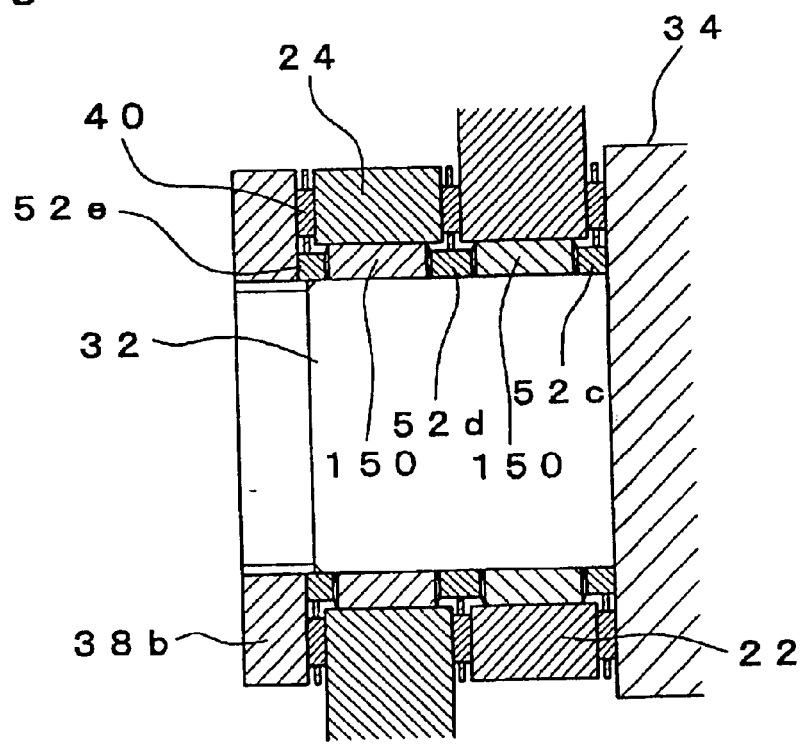
FIG. 4 is an enlarged partial schematic sectional view of a toggle arrangement of a third embodiment of the clamping device according to the present invention.
Figure 5A:
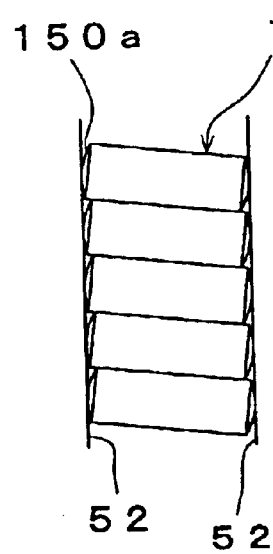
FIG. 5A is a view showing needle rollers having spherical opposite ends in FIG. 4.
Figure 5B:
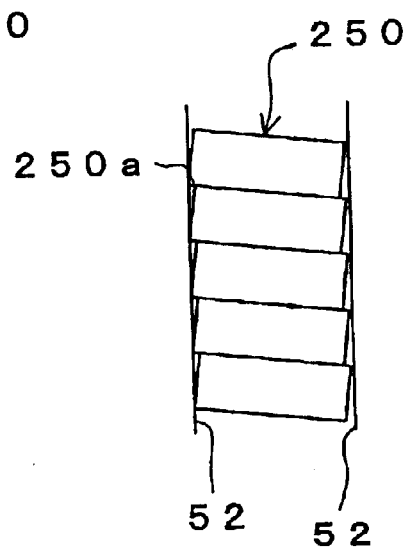
FIG. 5B is a view showing needle rollers having cylindrical or flat opposite ends.

Referring now to FIG. 4, the clamping device of the third embodiment according to the present invention will now be described hereinafter. The toggle arrangement in FIG. 4, illustrating in enlarged dimension the shaft 32 and the components facing the shaft 32, is a modified arrangement of the linkage shown in FIG. 3. Each of the needle rollers 150 of the linkage has spherical ends 150a so that, even if the rollers 150 skew as shown in FIG. 5A, the rollers 150 can be brought into contact with the opposed spacers 52 through the spherical ends 150a. With this construction, a stress concentration does not occur as in the case where needle rollers 250 each having cylindrical or flat ends as in FIG. 5B are used and, as a result, the skewing rollers 250 may be brought into contact with the opposed spacers 52 through the edges 250a. This construction has the advantage to improve the fatigue life of the spacers 52.

According to the present invention, where the thrust may be generated when the rollers of the radial needle bearing in the linkage skew, the components of the linkage are prevented from being damaged, which results in providing a clamping apparatus with high reliability.

What is claimed is:

1. A clamping apparatus comprising:

upper and lower platens;

at least one tiebar connecting the upper and lower platens;

an intermediate platen located between the upper and lower platens for movement relative to and along the tiebar;

an upper mold half on the upper platen;

a lower mold half on the intermediate platen;

a linkage connecting the lower and intermediate platens;

an intermediate shaft, a first shaft fixed to the intermediate platen, and a second shaft fixed to the lower platen; and a drive mechanism for driving the linkage so that the lower platen is moved relative to the intermediate platen, and the upper mold half on the upper platen is moved relative to the lower mold half on the intermediate platen, wherein the linkage includes upper and lower links connected with each other for rotation about the intermediate shaft, the upper link is pivotably supported on the first shaft, the lower link is pivotably supported on the second shaft, the intermediate shaft is operatively connected with the drive mechanism so that the drive mechanism transmits a driving force to the linkage, and at least one of the intermediate, first, and second shafts comprises a radial needle bearing and a thrust bearing.

2. A clamping apparatus comprising:

upper and lower platens;

at least one tiebar connecting the upper and lower platens;

an intermediate platen located between the upper and lower platens for movement relative to and along the tiebar;

an upper mold half on the upper platen;

a lower mold half on the intermediate platen;

an intermediate shaft, a first shaft fixed to the intermediate platen, and a second shaft fixed to the lower platen;

first and second linkages connecting the lower and intermediate platens; and a drive mechanism for driving the linkages so that the lower platen is moved relative to the intermediate platen, and the upper mold half on the upper platen is moved relative to the lower mold half on the intermediate platen, wherein each of the first and second linkages includes upper and lower links connected with each other for rotation on the intermediate shaft, the upper link of each linkage is pivotably supported on the first shaft fixed to the intermediate platen, the lower link of each linkage is pivotably supported on the second shaft fixed to the lower platen, the intermediate shaft of each of the first and second linkages is operatively connected with the drive mechanism so that the mechanism transmits a driving force to the linkages, at least one of the intermediate, first, and second shafts comprises a radial needle bearing and a thrust bearing, and at least one of (i) an upper link of the first linkage and an upper link of the second linkage are connected with each other via a first connecting member and (ii) a lower link of the first linkage, and a lower link of the second linkage are connected with each other via a second connecting member.

3. The clamping apparatus in accordance with claim 1, wherein:

the radial needle bearing includes needle rollers restrained against axial movement by annular holding members facing axial ends of the needle rollers; and each of the holding members is mounted separately from one of an upper link and a lower link that forms an outer ring of the radial needle bearing and the intermediate, first, or second shaft that forms an inner ring of the radial needle bearing.

4. The clamping apparatus in accordance with claim 3, wherein each of the needle rollers has spherical axial ends.

* * * * *